E. L. CONDON.
COMBINED COVER AND LADLE.
APPLICATION FILED JAN. 7, 1920.

1,391,371.

Patented Sept. 20, 1921.

Inventor
Ernest L. Condon
by Roberts, Roberts & Cushman
Attorneys

UNITED STATES PATENT OFFICE.

ERNEST L. CONDON, OF MEDWAY, MASSACHUSETTS, ASSIGNOR TO UNITED SODA FOUNTAIN COMPANY, OF BOSTON, MASSACHUSETTS, A CORPORATION OF MASSACHUSETTS.

COMBINED COVER AND LADLE.

1,391,371.           Specification of Letters Patent.     Patented Sept. 20, 1921.

Application filed January 7, 1920. Serial No. 349,898.

*To all whom it may concern:*

Be it known that I, ERNEST L. CONDON, a citizen of the United States, and resident of Medway, in the county of Norfolk and State of Massachusetts, have invented new and useful Improvements in Combined Covers and Ladles, of which the following is a specification.

This invention relates to a combination cover and ladle for a receptacle particularly designed for use at soda fountains. Receptacles or jars for crushed fruits and similar materials served at soda fountains, are commonly made with covers, and ordinary ladles are used for serving. If the ladle has a long enough handle to be convenient of access and to keep from slipping down into the receptacle, it interferes with the proper closing of the cover and also requires the dispenser to use both hands (unless the cover is first laid down) one to remove and hold the cover and the other to manipulate the ladle. If the ladle handle is short enough to permit the cover to close, it must necessarily be wholly within the receptacle and is not only inconvenient to reach, but also is sure to become soiled.

The principal objects of the present invention are to provide a combination ladle and cover which can be manipulated both together with one hand, which at all times affords a clean handle for the dispenser to seize, and which insures the most advantageous position of the ladle for serving the contents of the receptacle.

Figure 1:
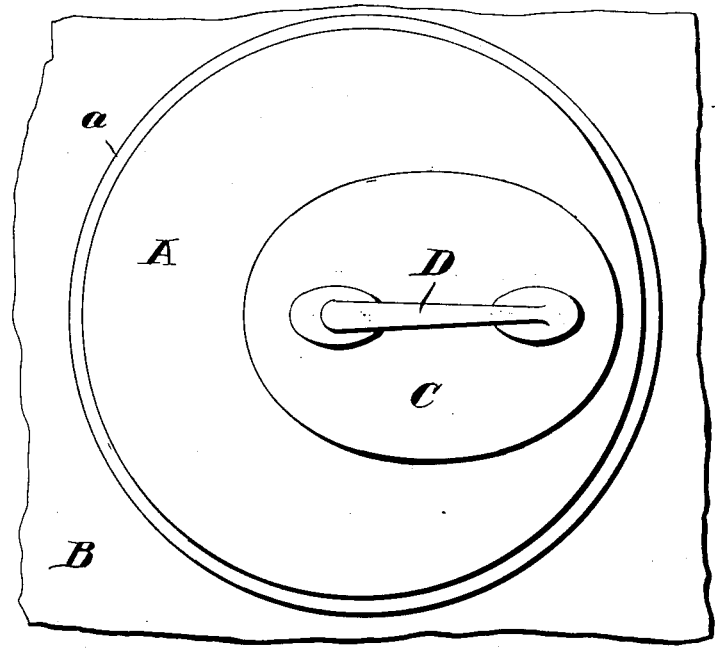
Figure 2:
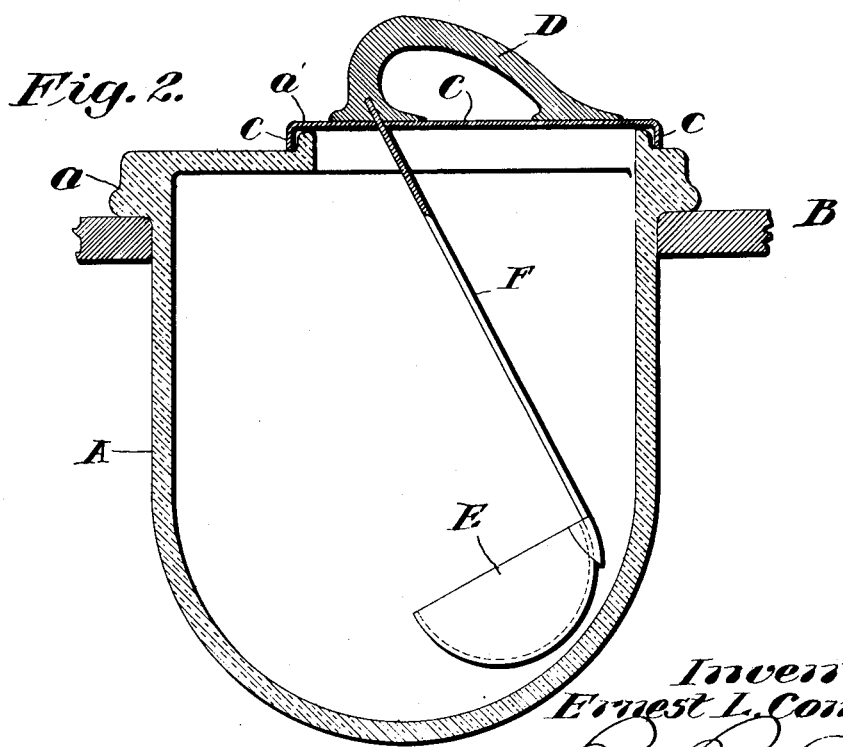

In the accompanying drawings which illustrate the preferred embodiment of the invention, Figures 1 and 2 represent respectively a plan view and vertical section of the combined cover and ladle applied to a receptacle for crushed fruits and the like, suitable for use at soda fountains.

A represents the receptacle, preferably made of glass or porcelain with a round bottom and a supporting flange $a$ at the top to rest upon a counter, shelf, or the like, B, with the body of the receptacle extending through an aperture in the counter. The receptacle has an opening in the top offset from the center, and surrounded by a rim or flange $a'$.

Fitting over the opening of the receptacle is a cover C having a down-turned lip $c$ to fit around the rim $a'$. On the upper side of the cover is secured a handle D, which is preferably of loop form and higher at the end toward the center of the receptacle than at the other end, the better to conform to the normal position of the hand of the user.

Secured to the underside of the cover and depending therefrom is a ladle consisting of the bowl E and shank F. The end of the shank extends through the cover C and is inset into one of the bases of the handle thus insuring a strong and rigid anchorage of the ladle to the cover. The ladle is fixed at an inclined angle to the cover, so that its bowl E will be offset from the center of the receptacle, in the direction of the offset of the receptacle opening, and somewhat tipped, as illustrated in Fig. 2. From this position, when the user lifts the cover by the handle D, the left hand edge of the cover will naturally be lifted a little in advance of the right hand edge and the bowl of the ladle will be drawn through the contents of the receptacle, starting from near one side and swinging toward the other side. Thus the natural motion of the ladle will be substantially similar to that of an ordinary ladle held in the hand, and the bowl will be sure to be filled. When the cover is replaced, the ladle will automatically assume the correct position near one side of the receptacle for the next similar operation.

By using the loop form of handle D, and anchoring the shank F of the ladle at an inclination to the cover in substantially the same vertical plane with the handle, and at the base of the higher end of the loop, a number of advantages are attained in addition to the mere convenience of a loop handle for manipulation of the device, and the strength of construction inherent in anchoring the shank to the base of the handle. The normal mode of grasping the handle and removing the cover will not only swing the ladle through the receptacle, as already mentioned, but when the ladle is filled and lifted out of the receptacle the bowl which is substantially normal to the stem will be level, and will not be concealed from the view of the dispenser by the cover, which is now tipped to one side, as it would be if the ladle extended straight down from the cover and had to be held level over the bowl of the ladle to prevent the contents of the ladle from being spilled.

The construction shown moreover insures the ladle being lifted out of the receptacle in correct position for pouring its contents into a glass or dish; because there is but one natural and normal way to grasp the handle D, and in that position the bowl of the ladle extends in the proper and natural direction for pouring or serving; whereas if the handle were a round knob, or of some other form not calculated to insure any particular relationship of the hand of the user to the position of the ladle, the dispenser would lift the ladle out without knowing in which direction the bowl of the ladle would extend, and would usually find it in an extremely awkward position for serving.

The attachment of the shank F to a point offset from the center of the cover, and the inclination of the ladle, also result in a nicely balanced structure, such that the cover and ladle could be lifted out if desired by one finger passed through the loop handle.

I claim:

1. A cover for a receptacle having a ladle depending from its under side, said ladle comprising a shank and a bowl, and an elongated handle extending transversely across the top of the cover, the axis of the ladle shank lying in the vertical plane of said handle.

2. A cover for a receptacle having a loop handle on its upper side and a ladle on its under side, said ladle comprising a shank and a bowl, the end of the shank of the ladle extending through the cover and into one of the bases of the handle, said shank depending from the cover at an inclined angle and crossing the axis of the receptacle.

3. A cover for a receptacle having on its upper side a loop handle comprising an element which slopes from one end toward the other, and a ladle depending from the under side of the cover, said ladle comprising a shank and a bowl carried thereby, the parts being so constructed and arranged that the plane of the upper edge of the bowl is inclined in a direction opposite to the slope of said handle element.

4. A cover for a receptacle having on its upper side a loop handle higher at one end than at the other, and a ladle comprising a shank depending from a point on the under side of the cover immediately underneath the base of the higher end of the handle, said shank being inclined to the axis of the receptacle and lying in the same vertical plane with the handle, and a bowl secured to said shank and so constructed and arranged that the plane of its upper edge is substantially normal to the axis of the shank.

5. A cover for a receptacle having a ladle comprising a shank and a bowl depending from its under side, and a loop handle on its upper side having an opening through which a finger may be hooked in a direction transverse of the direction in which the bowl of the ladle is directed.

6. In combination, a receptacle having an opening in the top, a cover fitting over said opening, and a ladle depending into the receptacle from the underside of said cover, said ladle comprising a shank secured to said cover at a point to one side of the center thereof and extending downwardly into the receptacle at an inclination to the axis thereof, and a bowl supported by the shank and so disposed with relation to the receptacle that upon removal of the cover the dipping edge of the bowl is caused to sweep across the axis of the receptacle.

7. In combination a receptacle having an opening in the top, a cover fitting over said opening, and a ladle depending into the receptacle from the under side of said cover, said ladle comprising a shank secured to said cover adjacent one edge thereof and normally crossing the axis of the receptacle and a bowl supported near the lower end of the shank and disposed with its dipping edge wholly to one side of the axis of the receptacle and directed toward such axis.

8. In combination a receptacle having an opening in its top offset from the center, a cover fitting over said opening, and a ladle on the under side of the cover depending into the receptacle at an inclined angle to the cover with its bowl offset from the center of the receptacle in the direction of the offset of the receptacle opening.

Signed by me at Boston, Massachusetts, this 30 day of December, 1919.

ERNEST L. CONDON.